United States Patent
Marsico et al.

(10) Patent No.: US 8,989,160 B1
(45) Date of Patent: *Mar. 24, 2015

(54) NETWORK DEVICE MANAGEMENT (75) Inventors: Robert G. Marsico, Las Vegas, NV (US); Marilyn J. Marsico, Las Vegas, NV (US); Carl A. Steen, North Barrington, IL (US); Maxwell A. Marsico, Las Vegas, NV (US)

(73) Assignee: Maxon, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,572

(22) Filed: Feb. 23, 2012

Related U.S. Application Data (60) Continuation of application No. 12/186,158, filed on Aug. 5, 2008, now abandoned, which is a continuation of application No. 11/668,247, filed on Jan. 29, 2007, now Pat. No. 7,489,671, which is a division of application No. 10/778,443, filed on Feb. 13, 2004, now Pat. No. 7,171,194, said application No. 12/186,158 is a continuation of application No. 10/779,270, filed on Feb. 13, 2004, now Pat. No. 7,486,649.

(60) Provisional application No. 60/447,436, filed on Feb. 14, 2003.

(51) Int. Cl.
*H04M 3/42* (2006.01)

(52) U.S. Cl.
USPC .......................................... 370/338; 370/352

(58) Field of Classification Search
None
See application file for complete search history.

(56) References Cited

U.S. PATENT DOCUMENTS

| | | | |
|---|---|---|---|
| 5,014,345 A | 5/1991 | Comroe et al. | |
| 5,136,636 A | 8/1992 | Wegrzynowicz | |
| 5,329,578 A | 7/1994 | Brennan | |
| 5,343,493 A | 8/1994 | Karimullah | |
| 5,533,108 A | 7/1996 | Harris et al. | |
| 5,625,886 A | 4/1997 | Raes | |
| 5,724,655 A | 3/1998 | Grube et al. | |
| 5,778,068 A | 7/1998 | Johnson | |
| 5,825,759 A | 10/1998 | Liu | |
| 5,936,941 A | 8/1999 | Kondo | |
| 5,966,714 A * | 10/1999 | Huang et al. .......................... 1/1 |
| 6,085,105 A | 7/2000 | Becher | |
| 6,141,556 A | 10/2000 | Dougherty et al. | |
| 6,160,585 A | 12/2000 | Schmidt et al. | |
| 6,178,335 B1 | 1/2001 | Vu | |
| 6,185,436 B1 | 2/2001 | Vu | |
| 6,298,228 B1 | 10/2001 | Singh | |
| 6,320,534 B1 | 11/2001 | Goss | |
| 6,332,157 B1 | 12/2001 | Mighdoll | |
| 6,377,787 B1 | 4/2002 | Bamburak | |
| 6,396,814 B1 | 5/2002 | Iwamura | |
| 6,404,761 B1 | 6/2002 | Snelling | |

(Continued)

OTHER PUBLICATIONS

USPTO Office Action dated Jun. 29, 2007 relating to U.S. Appl. No. 10/626,343, 25 pages.

(Continued)

*Primary Examiner* — Robert C Scheibel
(74) *Attorney, Agent, or Firm* — Brennan, Manna & Diamond, LLC (57) ABSTRACT

A method is provided to dynamically interact with a plurality of enabled devices within a personal network. Individual ones of the devices are configured to interoperate with a service provider network and configure or alter services to individually identifiable devices.

18 Claims, 7 Drawing Sheets

(56) References Cited

U.S. PATENT DOCUMENTS

| | | | |
|---|---|---|---|
| 6,449,483 | B1 | 9/2002 | Akhteruzzaman et al. |
| 6,457,007 | B1 | 9/2002 | Kikuchi |
| 6,543,164 | B1 | 4/2003 | Sperl |
| 6,744,874 | B2 | 6/2004 | Wu |
| 6,816,583 | B2 | 11/2004 | Roeder |
| 6,970,474 | B1 | 11/2005 | Sinha |
| 7,092,385 | B2 | 8/2006 | Gallant et al. |
| 7,155,226 | B1 * | 12/2006 | Oh et al. ........ 455/445 |
| 7,162,020 | B1 | 1/2007 | Forte |
| 7,190,969 | B1 * | 3/2007 | Oh et al. ........ 455/551 |
| 7,215,753 | B2 | 5/2007 | Parra Moyano et al. |
| 7,342,917 | B2 | 3/2008 | Mohan et al. |
| 7,486,649 | B2 * | 2/2009 | Marsico et al. ........ 370/338 |
| 2002/0172345 | A1 * | 11/2002 | Wu ........ 379/220.01 |
| 2003/0125072 | A1 | 7/2003 | Dent |
| 2004/0151295 | A1 | 8/2004 | Gilbert |

OTHER PUBLICATIONS

Designing an On-Demand Multimedia Service; P. Venkat Rangan, et al.; IEEE Communications Magazine, vol. 30, No. 7, Jul. 1992, pp. 56-65.

* cited by examiner

NETWORK DEVICE MANAGEMENT

RELATED APPLICATIONS

This application is a continuation of and claims priority to application Ser. No. 12/186,158 filed Aug. 5, 2008, which is a continuation of application Ser. No. 10/626,343 filed Jul. 24, 2003, which claims the benefit of provisional application Ser. No. 60/447,436 filed Feb. 14, 2003, and all are incorporated herein by reference.

BACKGROUND

The present invention relates generally to network systems. It finds particular applicability in conjunction with communication based networks and will be described with particular reference thereto. It is to be appreciated however, that the invention finds further application in systems and devices where it is desirable to use a single address with a plurality of devices.

The first generations of wireless mobile phones were large in size and expensive to use. However, over time, technology has reduced the size of the mobile telephone and lowered its cost of use, thereby enhancing mobility and expanding usage. With each subsequent generation of technology, the size of the device has been reduced while the functionality and types of devices available have increased dramatically.

With the introduction of digital cellular telephones, laptop computers, multi-function personal handheld devices, one can now send email, surf the web, make telephone calls, receive and send instant/short messages, view personal calendars, video conference, and send pictures seamlessly and continuously while connected to one or more wireless or wireline communications networks.

However, as service providers and equipment manufacturers drove device/service integration, complex devices were created that attempted to be all things to all users. As the complexity of communication devices increased, it created user confusion and communication solutions that were not optimally designed for any one specific intended use. Miniature thumb-operated keyboards, tiny screens so small the content and images are compromised, hanging earpieces, amplified speakers, and dangling microphones are prevalent in such devices and are often also tethered to an automobile cigarette lighter. To further complicate device designs, communication appliances are being configured as information management devices, and information management devices are being configured as communication appliances. These combined functions have resulted in designs that are unable to do either comfortably. These communication solutions quickly become tedious and annoying to use since the miniaturization and application integration was achieved by compromising the needs of the user.

SUMMARY

In one embodiment, an increased number of communication devices used by end-users are provided. Particular devices are optimized for specific tasks and applications. Laptop computers, personal digital assistants, video telephones, small telephones for travel, and traditional sized phones for home or automobile use are designed and optimized for a specific use.

In another embodiment, a means to effectively manage devices is provided. The devices are enabled to communicate within and across a communications network. As service providers consolidate their networks in order to support multiple services (voice, video, data), it is increasingly common for end-users to subscribe to multiple services while utilizing multiple appliances on a service providers network.

In another embodiment, a method and system are provided that allow a communication services user to use and manage a personal network of devices that operates as a single account utilizing one or more telephone number(s) within a service provider's network. This enables a de-centralized means to provide subscriber driven network device management and service provisioning.

BRIEF DESCRIPTION OF THE DRAWINGS

In the accompanying drawings which are incorporated in and constitute a part of the specification, embodiments are illustrated which, together with the detailed description given below, serve to describe exemplary embodiments. It will be appreciated that the illustrated boundaries of elements (e.g. boxes, groups of boxes, or other shapes) in the figures represent but exemplary boundaries. One of ordinary skill in the art will appreciate, for example, that one element may be designed as multiple elements or that multiple elements may be designed as one element. An element shown as an internal component of another element may be implemented as an external component and vice versa.

DESCRIPTION OF THE ILLUSTRATED EMBODIMENTS

The following description includes definitions of selected terms used throughout the disclosure. Both singular and plural forms of all terms fall within each meaning:

"Address", as used herein, includes but is not limited to one or more network accessible addresses, device identifiers, telephone numbers, IP addresses, url and ftp locations, e-mail addresses, names, a distribution list including one or more addresses, network drive locations, postal addresses, account numbers or other types of addresses that can identify a desired destination or device.

"Computer-readable medium", as used herein, refers to any non-transitory medium that participates directly or indirectly in providing signals, instructions and/or data to one or more processors for execution. Such a medium may take many forms, including but not limited to, non-volatile media, volatile media, and transmission media. Non-volatile media may include, for example, optical or magnetic disks. Volatile media may include dynamic memory. Transmission media may include coaxial cables, copper wire, and fiber optic cables. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASHEPROM, any other memory chip or cartridge, or any other medium from which a computer, a processor or other electronic device can read.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmed logic device, memory device containing instructions, or the like.

"Signal", as used herein, includes but is not limited to one or more electrical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software, computers or other devices, or combinations of these.

Generally speaking, one embodiment of a system and method is provided to enable a user to define, control and operate a personal network of one way or bi-directional devices capable of accessing a service provider's network, receiving services, or both. This can be accomplished by assembling a network of personal communications devices that may include transmitters, receivers or transceivers that share or can be configured to share the same address. The devices are configured to be compatible or selectively compatible with the service provider's network. In addition to assembling the network of personal communications devices, the user subscribes to one or more services made available by the service provider. Furthermore, the service provider's network uses a signaling protocol that allows for communications between device transceivers within the personal network and database units within the service provider's network.

In a simple exemplary network, a telephone service provider assigns a telephone number to a subscriber. In this simple network, the subscriber has multiple telephones, each used in different places and at different times. The subscriber registers each telephone including a unique serial number with the telephone service provider's database and a subscriber profile is created. The assigned "telephone number" actually refers to the subscriber profile identifying the subscriber's network. Each telephone occupies a record in the subscriber profile and is individually identifiable by the unique serial number. Once established, for example, a mobile telephone is selected to receive all incoming telephone calls. Once the subscriber returns home, the home phone replaces the mobile phone as the desired destination for all incoming calls (either automatically or through manual selection). In an embodiment, incoming signals such as calls, can be directed to the subscriber profile and a database dip can be configured to return the subscriber desired routing data to complete the call to a device. In an embodiment, outgoing signals such as calls, can be transmitted from a telephony enabled device over transmission medium to the subscriber's database, and/or to another device. Conveniently, charges associated with any of the devices in the subscriber's network can be aggregated onto a single bill.

In a more general embodiment, upon user initiation, a device communicates with a service provider's network. The device transmits a request to authentication logic operated by the service provider for access to some or all of the services available to the service provider's network, for example telephone services, text messaging services, video services and other services. Logic within the device can be configured to negotiate for access to services available from the service provider. Responsive to the request, the authentication logic authenticates the device's request for access and selectively makes available to or authorizes the device to use those services available from the service provider's network.

In another embodiment, the user initiates a request to modify or otherwise change the status of one or more devices within his personal network by modifying the service provider's database. The status of a device includes available services assigned to the device, and the device's registration on the network, for example, enabled or disabled from network participation. It will be appreciated that one device on the personal network can be configured to check or alter the status of that device, and/or other devices within the personal network. Moreover, device status can alternately be checked or configured via other mechanisms such as over the internet, through communication with a customer service feature and the like.

Figure 1:
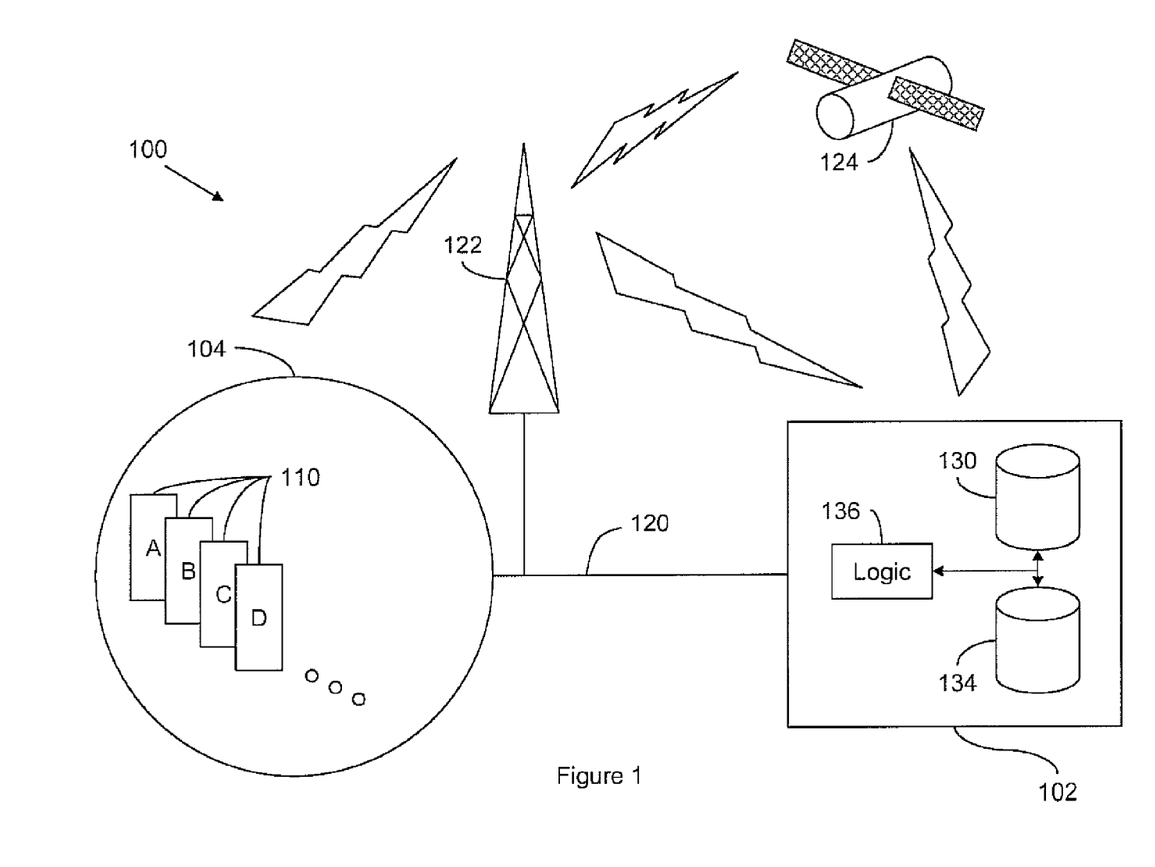
FIG. 1 is a system diagram illustrating an embodiment of a network.

One embodiment of the network device management is illustrated in FIG. 1. Network 100 includes a service provider network operations center 102, a plurality of personal networks 104 (one shown) and, a plurality of personal network devices 110 (A-D shown). The network devices 110 communicate with the service provider's network 102 across one or more transmission mediums such as conventional wireline networks 120, which include twisted pair, Hybrid Fiber Coaxial (HFC) fiber optics and the like; terrestrial wireless networks 122; and satellite or other aloft networks 124. The service provider's network 102 provides information such as communication services, voice, video, and/or data to personal networks 104 of network devices 110. It should be appreciated that the service provider may directly provide all of the services, or may act as a distributor of other providers' services. It should be further appreciated that network devices 110 include a variety of portable, mobile, analog cellular or digital devices, video and audio equipment, desk-top computers and the like configurable to have discrete addresses identifiable from the common address.

The service provider's network 102 uses transceiver equipment (not shown) coupled with one or more of the transmission mediums 120-124 to communicate information, network control, and system resource management to and/or from the personal networks 104. The service provider's network 102 includes computer-readable media such as database units that can be either centralized or distributed. Exemplary database units include an authentication and authorization database 130, and a subscriber database 134. Logic 136 is configured to process requests for access to network services accessing authentication and authorization database 130 and accessing or modifying stored information specific to each user, personal network 104, and network device 110. The subscriber database 134 is arranged to identify specific information regarding each user's personal network 104, network devices 110 and authorized network services. In the illustration, each database unit is in data communication with and under the control of logic 136 associated with the service provider's network 102 but such centralized control can be readily decentralized or segregated into two or more distinct elements with no loss of functionality.

Figure 2:
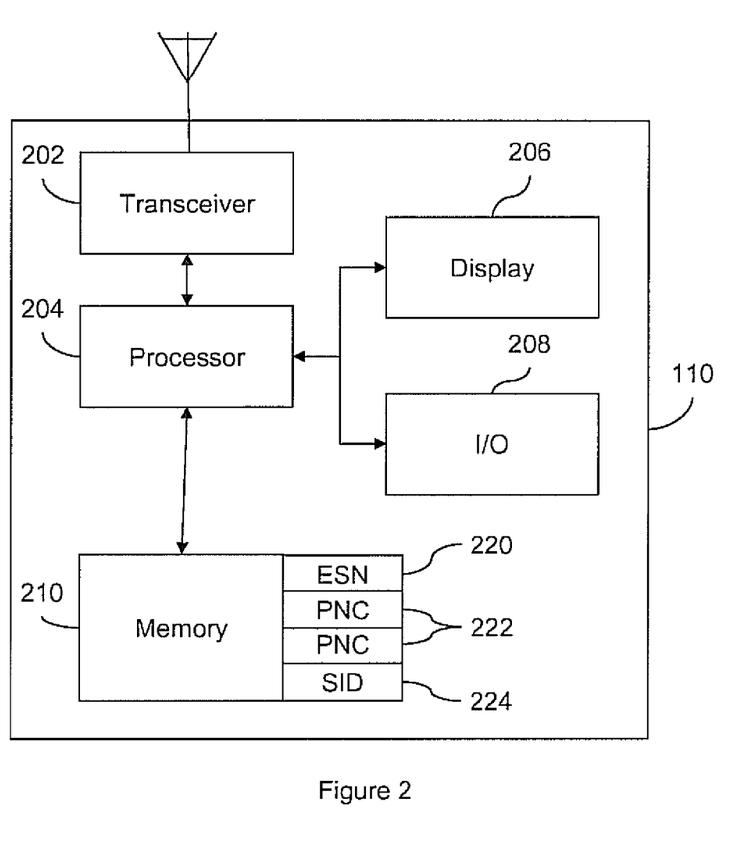
FIG. 2 is a functional block diagram illustrating an embodiment of a network device.

With reference to FIG. 2, an embodiment of a network device 110 includes a transceiver 202 in communication with a logic that may take the form of processor 204. The transceiver 202 may be configured to transmit, receive, or both signals including voice, video, and/or data transmissions formatted under several signaling protocols. While the transceiver 202 is illustrated connected to an antenna, wired connections are also envisioned for network devices 110. The processor 204 can also be in data communication with display logic 206 and input/output logic 208. A storage device medium 210 can be provided to store encryption algorithms, software programs, algorithms used to process signals and/or algorithms or logic used to implement communication controls and network system management. Storage device 210 can be configured with one or more computer-readable media or operably configured logic.

Additionally, the processor 204 is configured to access identification codes, such as the illustrated electronic serial number (ESN) 220, personal network code (PNC) 222, and system identification code (SID) 224. As further discussed below, these identification codes 220, 222, 224 enable, device management and communication. For example, in one embodiment ESN 220 corresponds to a device 110, PNC 222 corresponds to a personal network 104, and SID 224 corresponds to a service provider's network 102.

In one embodiment (ESN) 220 is generated from an individual device's hardware identification code. Typically, hardware identification codes are manufacturer assigned indicia which are unique to each network device. In another embodiment, ESN 220 is assigned by a service provider and held in memory. It should be appreciated that these identification codes need not be static, and can cycle or hop for example for security.

In another embodiment, each network device 110 stores or is assigned a personal network code (PNC) 222. The personal network code 222 is preferably unique within the communication network 100 but may be common among the network devices 110 within a personal network 104. As illustrated, each personal network 104 can have one or more personal network codes 222 corresponding to, for example, a single device belonging to more than one personal network such as in the case of a single home phone belonging to the personal networks of each occupant. The personal network code 222 may be a hexadecimal number or any address assigned by the user or the network service provider suitable to identify the personal network of devices.

Yet another embodiment includes the service provider assigning a network device 110 a system identification code (SID) 224. This system identification code 224 can be unique to the service provider and can be assigned to all network devices 110 that operate within the network 100. That is, the system identification code 224 is common to selected operable devices in the plurality of personal networks 104 in the overall network 100. The network device 110 has data access to the system identification code 224.

Figure 3:
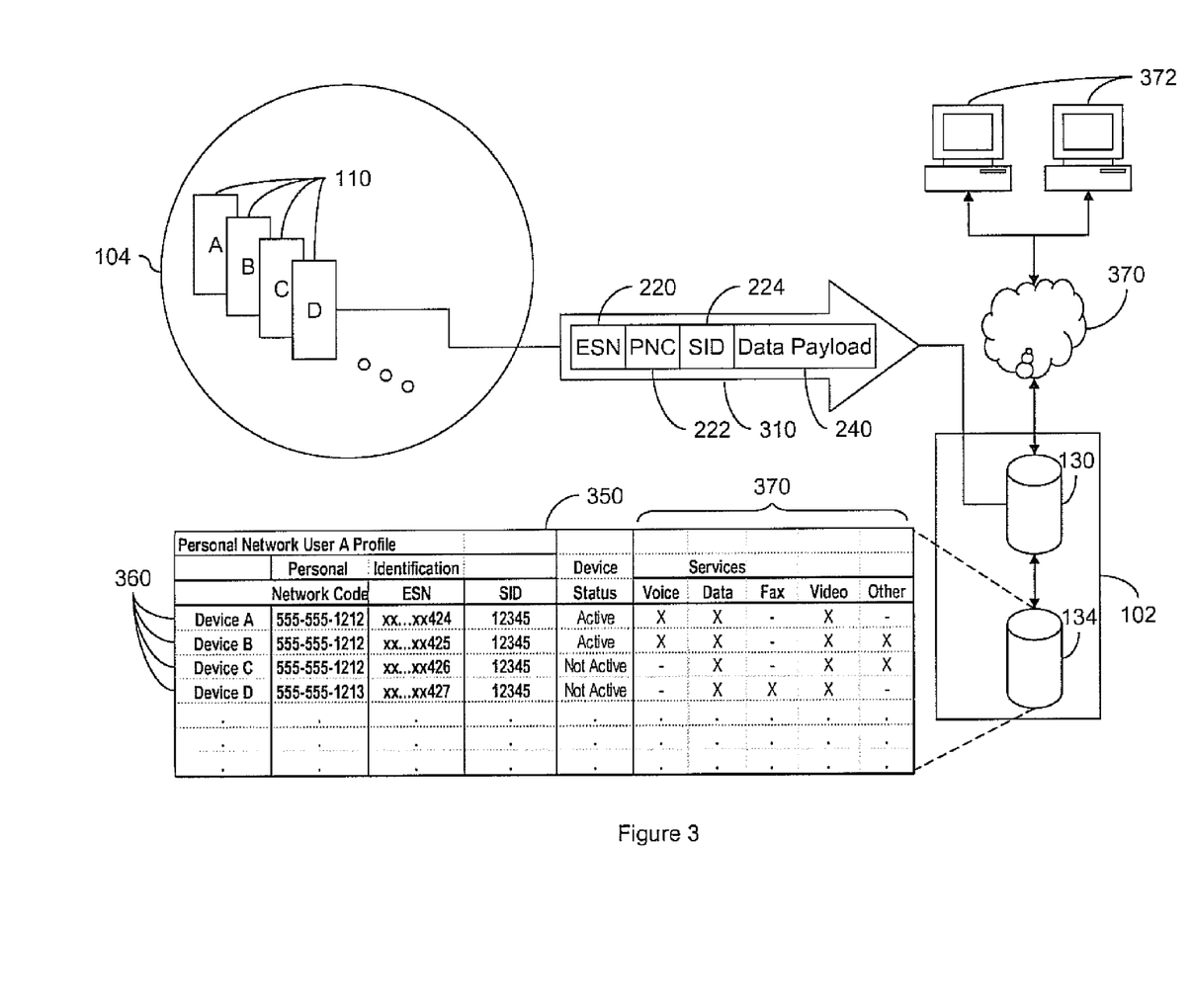
FIG. 3 is a system diagram illustrating another embodiment of a network and an exemplary record from a computer-readable medium

With reference now to FIG. 3, operation of a system according to an embodiment of the present invention is illustrated. Personal network 104 comprises one or more network devices 110 subscribing to service(s) provided by or available through the service provider's network 102. Each network device 110 is registered or registerable with the service provider network 102. Registration of each network device 110 may be accomplished either remotely or locally using either manual or automated means. Registration of each network device 110 can include the creation or modification of data fields within subscriber database 134, and authentication and authorization database 130. Each user's personal network 104 is represented within the subscriber database 134 with a profile, for example, profile 350 including individual device records 360. These individual device records are populated with fields identifying the device, the network, the like and also various services 370 available from the service provider's network. The authentication and authorization database 130 comprises fields for those identifiers associated with each device 110 registered, for example, the ESN 220 and PNC 222. Once a user has registered and enabled a network device 110 on the service provider's network 102, the network devices may communicate on, with, and through the communication network.

In another embodiment, the user can utilize one or more of the network devices 110 concurrently. Each device 110 can be used for one or more similar or different services 370 provided by the service provider. For example, in the telephone context, a device may be configured for audio services while another device may be configured for text-based services. Alternatively, a single device may be configured for both audio and text services. In yet another alternative, services may be segregated on an in-coming or out-going basis.

Initiated by the user or upon a triggering event, a network device 110 will signal the service provider's network 102 by sending an inbound signaling word (ISW) 310. As further discussed below, the ISW 310 can be configured to manage devices 110 in the personal network 104 by registering devices or changing services 370 available to specific devices. In the illustrated embodiment, the ESN 220, personal network code 222, system identification code 224, and data payload 240 comprise the ISW 310, which is used to access the service provider's network 102. The specific format of the ISW 310 is not integral to this invention. However, the ISW 310, or communication link to the service provider's network 102, includes a mechanism to identify the specific network 104 and a mechanism to communicate data.

A user can initiate a transmission in a variety of ways including, but not limited to: using an input device such as a keypad or keyboard, speaking into a microphone, pushing a button, using a pointing device, manipulating a joystick, using a dial or other type of mechanism, placing a device in a cradle, or other triggering mechanisms based on time, location, motion and the like. Regardless of the means in which the ISW 310 is initiated, the result includes transmission of the ISW 310. In the illustrated example, the ISW 310 transmits from the personal network 104, through the communications medium 120-124, to the service provider's network 102. The service provider's network 102 receives the transmission and logic (not shown) decodes the ISW 310 into its component data fields. The authentication and authorization database 130 is used to validate the received ISW 310 for access to the network resources including the personal network user profile 350. Once authenticated, components of the ISW 310, for example, the ESN 220, PNC 222 and the data payload 240 are communicated to the subscriber database 134 where the personal network profile is stored. The logic used to control and manipulate the subscriber database 134 decodes the data payload 240 of the ISW 310. Using the ESN 220 and PNC 222 (or other entries or combinations thereof) to index to the correct personal network user profile 350 and the correct field 360 within the profile, the subscriber database 134 will then operate upon the data payload 240.

In one embodiment, the data payload 240 is developed and specified by the user prior to initiating the ISW 310 transmission. The user creates the payload 240 through manipulation of the input output logic 208 associated with the network device 110. Specific payload signals will vary amongst network devices 110 depending upon the capabilities of each device and the capabilities of the service provider's network 102. However, in general, through the use of each network device 110, the user can develop payload information to control and manage the services 370 available within his personal network 104. Generally, this control occurs through the manipulation of personal network user profile 350 stored within the service provider's subscriber database 134. Examples, of payload commands that can be developed and initiated by the user include, but are not limited to: on/off status command; on/off service selection commands; addition/deletion of services; addition/deletion of devices; addition/deletion of personal network codes; routing to and from specific devices 110 and the like. Essentially, the user dynamically defines, controls, manages and operates the services available to each network device 110 within his personal communications network 104. Furthermore, since network devices 110 can share the same personal network code 222 (e.g. address, telephone number, and the like), the user has the ability to use different devices for different tasks either at the same or different times by manipulating the services profile for each device.

In another embodiment, a user initiates a request to modify or otherwise change the status of one or more devices 110 within his personal network 104 by modifying information in the service provider's network 102 with a particular data payload 240. For example, after successful authentication, database manipulation to index to the appropriate personal network user profile 350 and the successful decode of the data payload, the subscriber database 134 is updated to incorporate the data payload 240. During an update, the subscriber database 134 verifies, establishes, or changes status of the network device fields 360 within the profile as directed by the data payload. This updated personal network profile 350 is stored and becomes the profile that defines the personal network 104, network devices 110 and/or the services available.

It is understood that the procedures described can be modified to include user-initiated manipulation of the personal network user profile 350 through means other than using a network device 110. For example in another embodiment, a user accesses the service provider's subscriber database 134 through a public network such as the Internet 370 using a connecting device 372. In one embodiment, the user authenticates, for example via a username/password algorithm. Once authenticated, the user's personal network user profile 350 can be modified by the user. Once complete, the user logs out of the database and the subscriber database 134 retains and implements any changes made to the profile.

Figure 4:
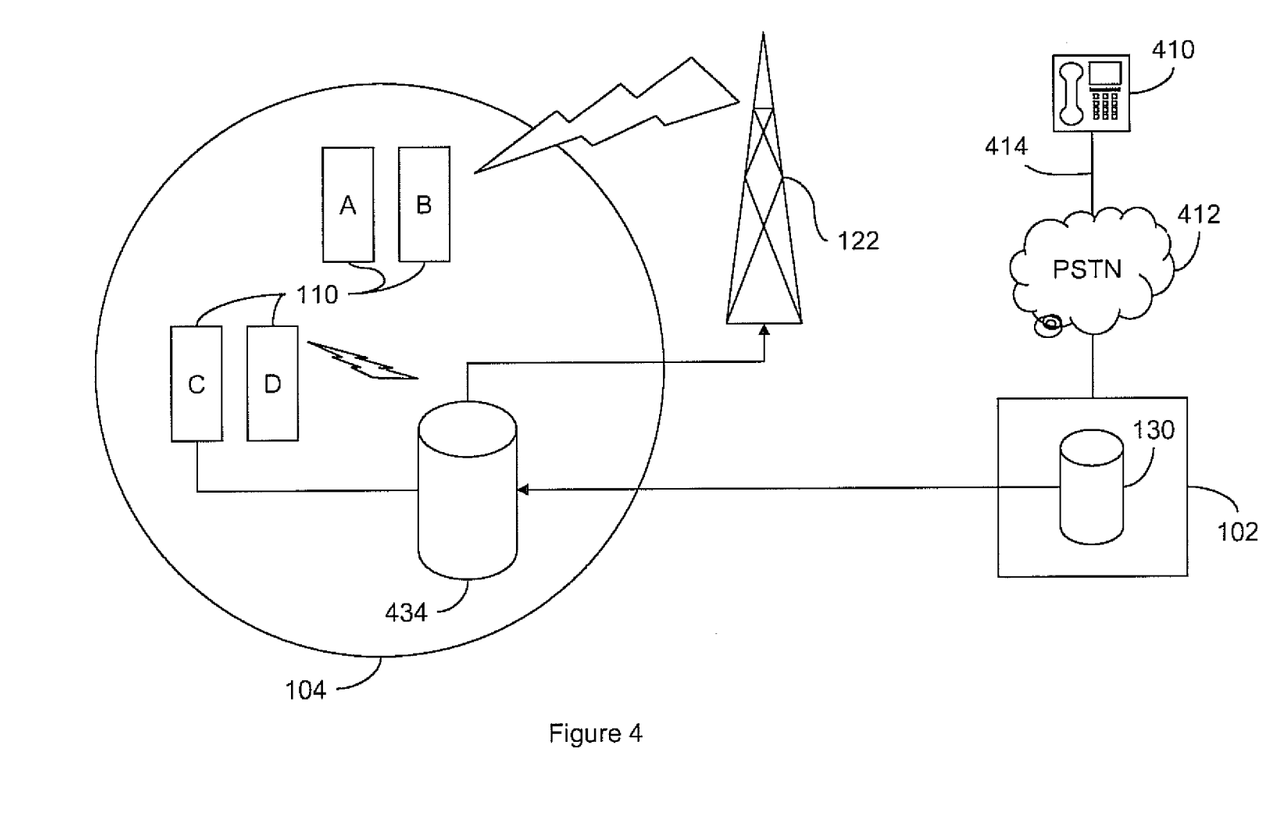
FIG. 4 is a system diagram illustrating another embodiment of a network.

With reference now to FIG. 4, an alternate embodiment of personal network 104 configured as a distributed network includes a personal network logic 400 including distributed subscriber database 434. The personal network logic 400 provides an interface between selected devices 110C, 10D and the service provider network 102. To illustrate a routing example, a telephone call directed toward personal network 104 is received by the personal network logic 400. The logic 400 receives the incoming signal, determines routing instructions from the distributed subscriber database 434, and routes the call to the particular device (e.g., 110C) where telephone signals (in this example) are to be received. In one embodiment the personal network logic 400 acts as a local switch directing data to particular devices within the personal network, for example inside of a home or office. Personal network logic 400 is in data communication with selected devices either via hardwiring or wireless links. In the event that a call is directed to a device not within direct communication with the personal network logic 400, the call is redirected, for example, over telephone infrastructure 122 which completes the call to the designated call-receiving device, for example 110B.

It can now be appreciated that the personal network logic 400 performs a proxy-like communications service between selected network devices that may or may not be configured to communicate directly with the communications network and the service provider network. As an example, a caller originating a telephone communication from device 410 connects through the public switched telephone network 412 to the service provider's network 102. Access database 130 recognizes from incoming service data 414, an inbound called number in this example, that the call is directed toward a personal network 104. Personal network logic 400 receives the call and identifies an attribute from the service data 414 suitable to identify the service provided, here a telephone call. Such identification can occur by recognizing attributes of various services or by a coded prefix or other identifying data appended to the incoming service data 414. After identifying the service, personal network logic 400 accesses the personal network profile 350 from distributed subscriber database 434 to identify the selected communication device setup to receive the service in the network. The call, in this example, is then directed to the desired communication device 110 based on the service attribute and the values in the personal network profile 350. It can now be appreciated that the personal network switch 400 may also incorporate either partially or entirely all the database functions provided by the service provider network 102. Moreover, while the call is illustrated as being routed through the subscriber's network 102, under the illustrated system, the call may be routed directly to the personal network 104.

It should be noted that although the service provider's network 102 has been discussed as including both the transmission network 120, 122, 124 and the databases 130, 134, this is not a requirement for the invention. Those skilled can appreciate that implementations exist in an environment where the access network provider is not the same as the application/services provider who operates, maintains and makes available services to users with personal networks and network devices. In such cases, one or more networks are used to obtain access to the personal network user profile for manipulation and management. Indeed, various services from multiple providers may be available through the service provider's network. For example video services may be provided from one provider, while voice services may be provided from another.

As an example of the above-described process, assume that a personal network Z consists of 3 personal network devices (A, B, C) each with a unique ESN and sharing the same personal network code (555-555-1212). Each of the three devices has been successfully registered and enabled for operation on service provider D's network. Below is an example of some possible attributes of each network device and a personal network user profile:

CHART 1

Service Provider D Subscriber Database
Personal Network Z User Profile

| Device | Type | Personal Network Code | Device ESN | Device Status | Voice Service | Video Service | Data Service |
|---|---|---|---|---|---|---|---|
| Device A | Portable Telephone | 555-555-1212 | ABC12345 | On | Enabled | Disabled | Disabled |
| Device B | Pers. Dig. Assistant | 555-555-1212 | DEF54321 | On | Disabled | Enabled | Enabled |
| Device C | Video Telephone | 555-555-1212 | GHI12345 | On | Disabled | Disabled | Disabled |

Assume that the user who manages personal network Z would like to receive/send his video communications by utilizing his portable telephone (Device A) while on the road. Video service is currently not enabled on his portable phone. To enable his portable phone to receive/send video communications, the user will manipulate the menu selection utilizing the soft-keys on his portable telephone to select "enable video communications". Once selected, the portable telephone will transmit an ISW that will be received by the service provider D's network. Once received, the ISW will be decoded and the information sent to the authentication and authorization database. Assuming the network device and ISW successfully authenticate, the ISW will be delivered to the service providers subscriber database. The subscriber database will use components of the ISW such as the personal network code and the ESN, to index to the specific record in the personal network user Z profile. The subscriber database logic will then operate on the payload data included in the ISW received from personal network device A. In this instance, the payload data instructs the service provider subscriber database to change the personal network user Z profile, enabling Device A, the portable telephone, to receive/send video communications. Once changed, the subscriber database will save the modified version of the personal network user Z profile. The modified personal network user Z profile is shown below:

CHART 2

Service Provider D Subscriber Database
Personal Network Z User Profile (modified)

| Device | Type | Personal Network Code | Device ESN | Device Status | Voice Service | Video Service | Data Service |
|---|---|---|---|---|---|---|---|
| Device A | Portable Telephone | 555-555-1212 | ABC12345 | On | Enabled | Enabled | Disabled |
| Device B | Pers. Dig. Assistant | 555-555-1212 | DEF54321 | On | Disabled | Enabled | Enabled |
| Device C | Video Telephone | 555-555-1212 | GHI12345 | On | Disabled | Disabled | Disabled |

Figure 5:
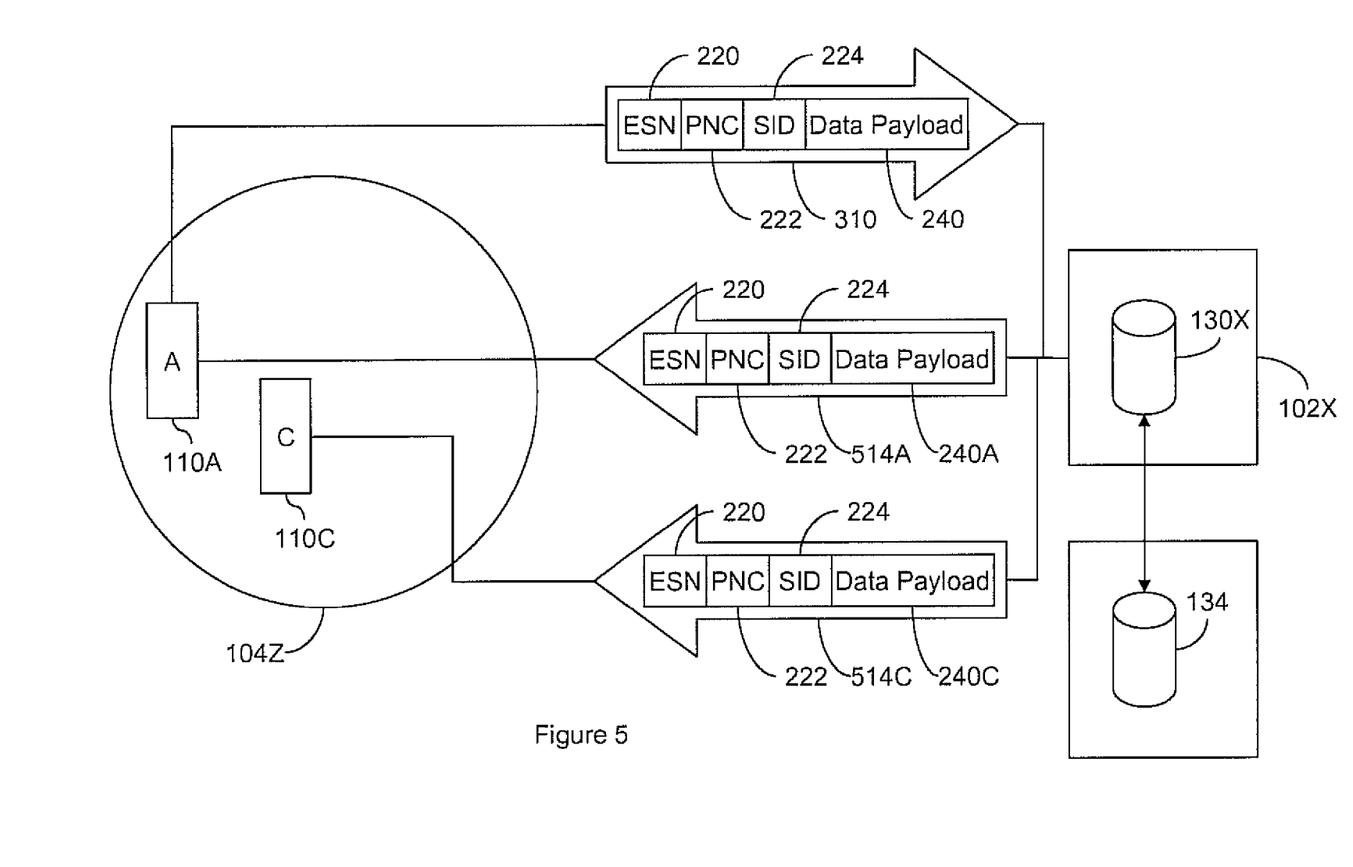
FIG. 5 is a system diagram illustrating one embodiment of a system for managing a network.

FIG. 5 illustrates an additional embodiment for managing the personal network. Introduced in FIG. 5 is the concept of the Outbound Signaling Word (OSW) 514 that is incorporated in certain embodiments. The OSW is similar to the ISW explained above, with the exception that it represents data communication from the service provider's network 102 to the network device 110, for example to transfer signals from the subscriber database 134 to network devices 110.

Referring to FIG. 5, assume that a personal network 104Z consists of two personal network devices 110A, 110C each with a unique ESN and sharing the same personal network code (555-555-1212). Each device has been successfully registered and enabled for operation on service provider 102X's network. Below is an example of some possible attributes of each network device and a personal network user profile:

CHART 3

Service Provider X Subscriber Database
Personal Network Z User Profile

| Device | Type | Personal Network Code | Device ESN | Device Status | Voice Service | Video Service | Data Service |
|---|---|---|---|---|---|---|---|
| Device A | Portable Telephone | 555-555-1212 | ABC12345 | On | Enabled | Disabled | Disabled |
| Device C | Mobile Telephone | 555-555-1212 | GHI12345 | Off | Disabled | Disabled | Disabled |

Assume that the user who manages personal network 104Z is initially receiving and sending voice communications by utilizing portable telephone 110A. At some point in time later, the user would prefer to use mobile telephone 110C instead of portable telephone 110A. To enable mobile telephone 110C to receive/send voice communications, the user will manipulate a menu selection or other interface on either portable telephone 110A or mobile telephone 110C to select "swap profiles from one device to another". Assuming the command was sent from portable telephone 110A, an ISW 310 is transmitted to the service provider network 102X. Once received, the ISW will be decoded and the information authenticated with database 130X. Assuming the portable telephone 110A and the sent ISW 310 successfully authenticate, the ISW is delivered to the service provider's subscriber database 134 which is illustrated in an alternate configuration separate from service provider's network 102X and authorization database 130X. The subscriber database will use the personal network code 222 and the ESN 220, included in the ISW 310 to index to a specific record in the personal network user Z profile (see e.g. charts 3, 4). The subscriber database logic will then operate on the payload data included in the ISW received from network device 110A. In this instance, the payload data instructs the service provider subscriber database 134 to swap the personal network user Z profile of network device 110A with that of network device 110C, enabling the mobile telephone to receive/send audio communications and setting network device 110A to "off" status. Once changed, the subscriber database will save the modified version of the personal network User Z profile. The modified personal network user Z profile is shown below:

CHART 4

Service Provider D Subscriber Database
Personal Network Z User Profile (modified)

| Device | Type | Personal Network Code | Device ESN | Device Status | Voice Service | Video Service | Data Service |
|---|---|---|---|---|---|---|---|
| Device A | Portable Telephone | 555-555-1212 | ABC12345 | Off | Disabled | Disabled | Disabled |
| Device C | Mobile Telephone | 555-555-1212 | GHI12345 | On | Enabled | Disabled | Disabled |

After the subscriber database 134 stores the new user profile to memory, an OSW 514A, C is initiated to each of the network devices 110A, 110C effected by the previous ISW 310 database transaction. OSW 514A is sent to network device 110A and OSW 514C is delivered to network device 110C. For example, both OSW 514A and OSW 514C include a personal network code 222 identifying personal network 104Z. OSW 514A further includes ESN 220A identifying device 110A while OSW 514C includes ESN 220C identifying device 110C. Each OSW 514 carries the respective data payload 240A, C representing changes to each respective network device profiles representing the modifications to the user's personal network profile requested by the ISW 310. Network device 110A and 110C respective logic will then operate on their received payload data included in each of the OSW's received from the subscriber database 134. In this instance, the payload data provides device profile modifications reflective of the updated subscriber database initiated by the ISW. The final result enjoyed by the user is a mobile device enabled for voice communications and a portable device that is not.

A method is provided that enables a user to define, control and operate a personal network of devices within a service provider's communication system. In one embodiment, this is accomplished by assembling a network of personal communications devices incorporating transceivers that share the same address, customer account information, telephone number, billing information and are compatible with the service provider's communication system. In addition to assembling the network of personal communications devices, the user subscribes to one or more services made available by the service provider. Furthermore, service provider's network provides for a signaling protocol that allows for communications between device transceivers within the personal network and database units within the service provider's network. Thus, communications equipment manufacturers and service providers alike can deliver multiple services to a single user while allowing the user to utilize multiple devices at his convenience. Also provided is a process that enables the user to utilize more than one personal network device and a mechanism to actively manage his personal network devices and network services.

In yet another embodiment, individual ones of devices hand-off designated services in response to a triggering event. The triggering event can be user initiated, proximity based or otherwise. For example, when a mobile phone detects a home based phone and an automatic hand-off indicator is present, the home phone can be configured to send an ISW enabling itself for designated services and disabling the mobile phone. In another embodiment the mobile phone can be configured to send an ISW disabling itself for those designated services. Coordination between the two hand-shaking devices could occur over the personal network, over a local short range network such as Bluetooth, or 802.11 protocol networks and the like.

Figure 6:
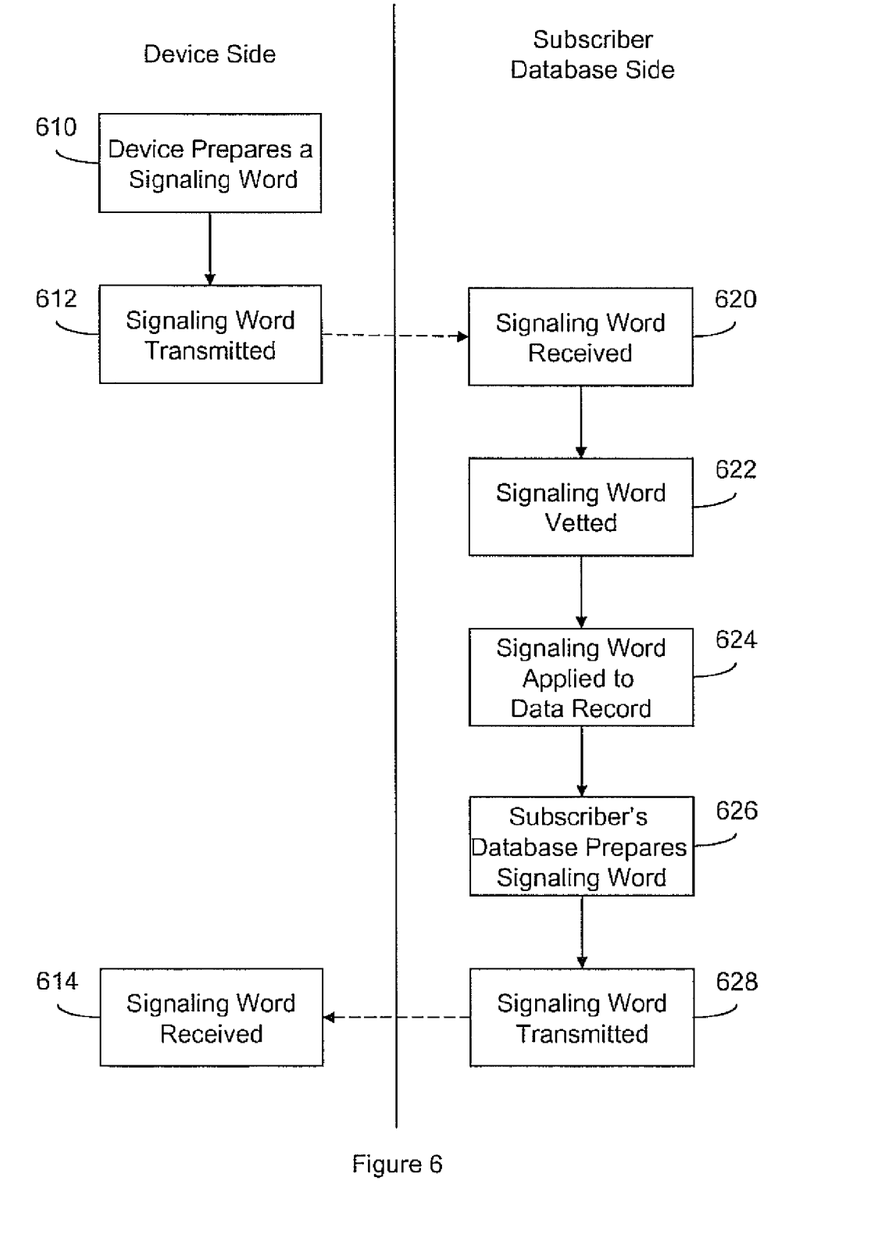
FIG. 6 illustrates one embodiment of a methodology for managing a network of devices.

Referring now to FIG. 6, a methodology implementable in software for managing a network of devices is illustrated. Upon a triggering event or user request, a device prepares a signaling word to implement a particular network device management configuration, (block 610). The signaling word is transmitted or otherwise communicated to logic including the subscriber database, (block 612). On the subscriber database side, the signaling word is received, (block 620). Authentication logic authenticates, decodes, or otherwise verifies the received signaling word as proper, (block 622). The payload is then applied to the appropriate data record or records identified by the signaling word, (block 624). Responsive to success or failure to manage the personal network devices by application of the payload, a return signaling word is prepared, (block 626). The signaling word is transmitted or otherwise communicated to logic including the devices within the personal device network, (block 628). The signaling word is received on the device side, (block 614). Upon receipt of the signaling word on the device side, the device can be configured to display a status report for the effected device or selected devices in the network. It can be appreciated that the methodology can be implemented as discussed above through managed network devices, other network devices, or through mechanisms that access the subscriber database side via network external devices.

In yet another embodiment, the service provider 102 is located and maintained at the home or other place designated by a user. In this configuration, the databases and associated equipment can be associated uniquely with an individual user's network or scalable up to full service provider for multiple users. In the individual configuration, the service provider 102 is configured to adapt to legacy equipment such as twisted pair, other wireline telephony presently supplied to many consumers, cable, satellite or other communications means. Routing can be redirected back into the legacy equipment or alternately routed over a wireless network as desired.

Figure 7:
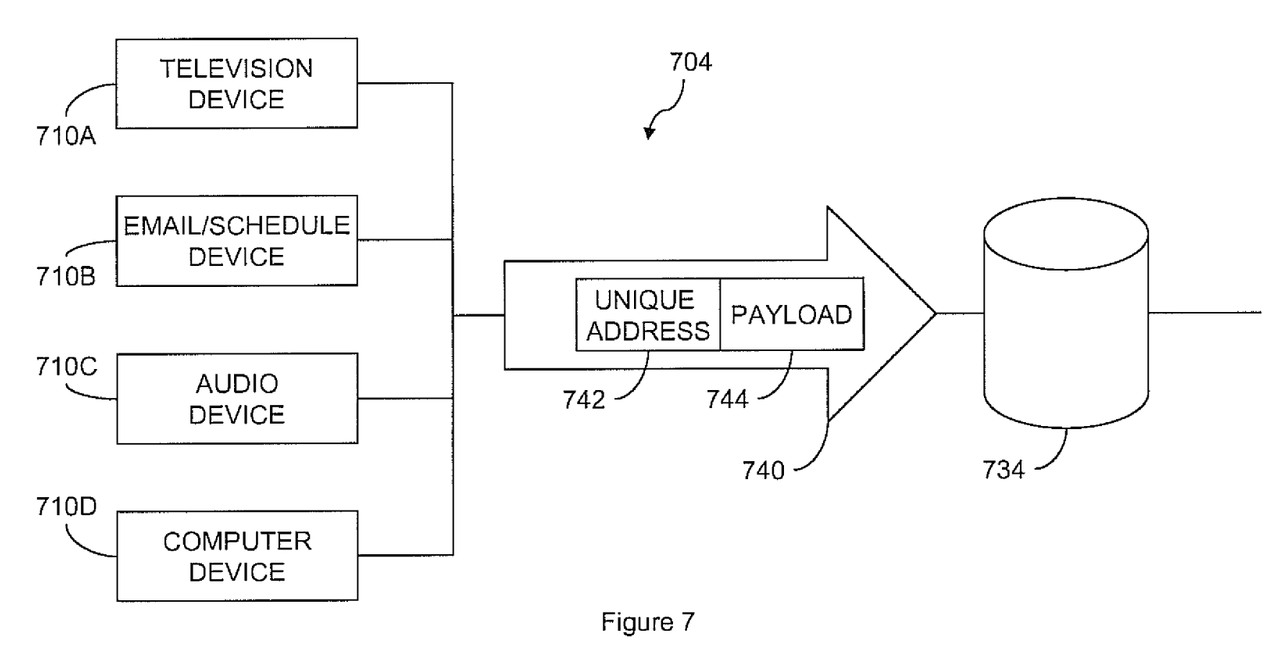
FIG. 7 is a system diagram illustrating another embodiment of a network.

With reference now to FIG. 7, an embodiment illustrates distribution of additional services to individual devices in a personal network 704. As illustrated, the personal network 704 includes television devices 710A, personal mail and scheduling devices 710B, audio devices 710C, and computer devices 710D. A record contained in distributed subscriber database 734 maintains a profile including desired routing for specific incoming signals. For example, an inbound signaling word 740 includes a unique network device identifier 742 and a payload 744 configured, for example, to create or update a record (not shown) directing incoming television or other motion picture signals toward television device 710A. Other signaling words route music, radio and, in certain embodiments audio tracks of associated motion picture signals toward audio device 710C, and match other services to other devices as desired by the subscriber. Those skilled in the art can now appreciate that multiple devices, for example multiple television devices, are configurable to receive a particular incoming signal.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method of controlling services to an audio-video device in a personal network, the method comprising:
   receiving an inbound signaling word comprising a unique identifier that uniquely identifies the audio-video device and payload data representing a change to the personal network, where the personal network is identified by an address and includes a plurality of devices each identified by a different address,
   based on the payload data, identifying an audio-video service capable of being used by the audio-video device available to the personal network from at least one service provider responsive to satisfying the change;
   effecting the change to the personal network making the identified audio-video service available to the audio-video device; and
   sending a return signaling word comprising the unique identifier that uniquely identifies the audio-video device and data representative of the change to the personal network, the return signaling word responsive to the change to the personal network established by the effecting step.

2. The method of controlling services as set forth in claim 1, where the effecting comprises updating a database containing data corresponding to the personal network, the database containing information usable to provide audio-video services available generally to the personal network to particular audio-video devices within the personal network and to reflect a registration status of audio-video devices in the personal network.

3. The method of controlling services as set forth in claim 1, further comprising providing an audio-video service available to the personal network from at least one service provider to the audio-video device.

4. The method of controlling services as set forth in claim 1, further comprising ceasing providing an audio-video service available to the personal network from at least one service provider to the audio-video device.

5. The method of controlling services as set forth in claim 1, further comprising authenticating the received inbound signaling word.

6. The method of controlling services as set forth in claim 1, where the audio-video device is selected from one of a television, a smart-phone, a computer, a digital cellular telephone and a multifunction personal handheld device.

7. The method of controlling services as set forth in claim 1, further comprising preparing a return signaling word comprising (i) a unique identifier that uniquely identifies a second audio-video device that had the identified audio-video service available; and (ii) data representative of the change to the personal network.

8. An audio-video device capable of sharing services with a plurality of other devices within a personal network, the audio-video device comprising:
   a computer-readable medium having storage for a first address corresponding to the audio-video device, a second address corresponding to the personal network, and a third address corresponding to a service provider network;
   input/output logic configured to receive from a user a desired change to a service capable of being provisioned to the audio-video device from at least one service available generally to the personal network;
   a processor in communication with the computer-readable medium and the input/output logic, the processor programmed to prepare an inbound signaling word comprising at least the first address and payload data representing the desired change to the service capable of being provisioned to the audio-video device from the personal network; and
   a transceiver providing the inbound signaling word to the service provider network where the service provider network comprises logic to process the inbound signaling word including modifying stored information in a subscriber database to effect the desired change to the service capable of being provisioned to the audio-video device from the personal network, the transceiver further receiving an outbound signaling word comprising the first address corresponding to the audio-video device and data indicating the desired change to the personal network, the outbound signaling word responsive to the desired change to the service capable of being provisioned to the audio-video device from the personal network.

9. The audio-video device as set forth in claim 8 where the first address comprises a manufacturer assigned identification code unique to the audio-video device.

10. The audio-video device as set forth in claim 8 where the first address comprises a service provider assigned identification code unique to the audio-video device.

11. The audio-video device as set forth in claim 8 where the second address comprises an email address.

12. The audio-video device as set forth in claim 8 where the second address comprises an account number.

13. The audio-video device as set forth in claim 8 where the third address comprises an IP address, URL or ftp location.

14. The audio-video device as set forth in claim 8 where the third address comprises a location of the subscriber database.

15. A method of provisioning services to an audio-video device comprising:

delivering a computer program to the audio-video device, where the computer program includes instructions for the audio-video device to (i) receive from a user a desired change to a service capable of being provisioned to the audio-video device from at least one service available generally to a personal network, (ii) prepare an inbound signaling word comprising at least a first address corresponding to the audio-video device and payload data representing the desired change to the service capable of being provisioned to the audio-video device from the personal network, and (iii) send the inbound signaling word;

receiving the inbound signaling word;

determining from the inbound signaling word the desired change to the service capable of being provisioned to the audio-video device;

assigning an audio-video service, available to the personal network and responsive to the desired change, to the audio-video device;

sending a return signaling word comprising at least the first address corresponding to the audio-video device and data representative of the desired change to the personal network, the return signaling word indicating the assignment of the audio-video service to the audio-video device; and providing the audio-video service to the audio-video device.

16. The method of provisioning services as set forth in claim 15, further comprising ceasing providing an audio-video service available to the personal network from at least one service provider to the audio-video device.

17. The method of provisioning services as set forth in claim 15, further comprising verifying the received inbound signaling word.

18. The method of provisioning services as set forth in claim 15, where the audio-video device is selected from one of a television, a smart-phone, a computer, a digital cellular telephone and a multifunction personal handheld device.

\* \* \* \* \*

UNITED STATES PATENT AND TRADEMARK OFFICE
CERTIFICATE OF CORRECTION

| | |
|---|---|
| PATENT NO. | : 8,989,160 B1 |
| APPLICATION NO. | : 13/403572 |
| DATED | : March 24, 2015 |
| INVENTOR(S) | : Robert G. Marsico et al. |

Page 1 of 1

It is certified that error appears in the above-identified patent and that said Letters Patent is hereby corrected as shown below:

On the Title page, Item (60), delete the Related U.S. Application Data, and substitute the following:

--(60) Continuation of application No. 12/186,158, filed on August 5, 2008, now abandoned, which is a continuation of application No. 11/668,247, filed on January 29, 2007, now Patent No. 7,489,671, which is a divisional of application No. 10/778,443, filed on February 13, 2004, now Patent No. 7,171,194, which claims the benefit of application No. 60/447,436, filed February 14, 2003, now expired, and said continuation application No. 12/186,158, filed on August 5, 2008, now abandoned, is a continuation of application No. 10/779,270, filed on February 13, 2004, now Patent No. 7,486,649, which claims the benefit of application No. 60/447,436, filed February 14, 2003, now expired.--

Signed and Sealed this
Twenty-third Day of February, 2016

Michelle K. Lee
*Director of the United States Patent and Trademark Office*